(12) United States Patent
Tang

(10) Patent No.: US 8,000,030 B2
(45) Date of Patent: Aug. 16, 2011

(54) IMAGING LENS ASSEMBLY

(75) Inventor: Hsiang-Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 8 days.

(21) Appl. No.: 12/561,632

(22) Filed: Sep. 17, 2009

(65) Prior Publication Data

US 2010/0265593 A1   Oct. 21, 2010

(30) Foreign Application Priority Data

Apr. 20, 2009   (TW) ................................ 98112995 A

(51) Int. Cl.
  *G02B 13/18*   (2006.01)
  *G02B 9/60*    (2006.01)
(52) U.S. Cl. ......................... 359/714; 359/763; 359/765
(58) Field of Classification Search .................. 359/764, 359/763, 765, 714, 746, 757, 758, 766, 760, 359/761, 767, 772, 775, 713
See application file for complete search history.

(56) References Cited

U.S. PATENT DOCUMENTS

| 5,442,485 | A | * | 8/1995 | Yamanashi | 359/683 |
| 5,798,872 | A | * | 8/1998 | Uzawa | 359/686 |
| 5,959,785 | A | * | 9/1999 | Adachi | 359/692 |
| 7,365,920 | B2 | | 4/2008 | Noda | |
| 2007/0053075 | A1 | * | 3/2007 | Kamo | 359/733 |
| 2010/0315724 | A1 | * | 12/2010 | Fukuta et al. | 359/716 |

FOREIGN PATENT DOCUMENTS

| CN | 1164033 A | 11/1997 |
| CN | 1737635 A | 2/2006 |
| CN | 1841111 A | 10/2006 |
| CN | 101178472 A | 5/2008 |
| CN | 101382642 A | 3/2009 |

* cited by examiner

*Primary Examiner* — Scott J Sugarman
(74) *Attorney, Agent, or Firm* — Tim Tingkang Xia; Morris, Manning & Martin, LLP

(57) ABSTRACT

The present invention provides an imaging lens assembly including, in order from an object side to an image side: a first lens element with positive refractive power having a convex object-side surface; a second lens element with negative refractive power; a third lens element with negative refractive power; a fourth lens element with positive refractive power having a convex object-side surface; a fifth lens element having a concave image-side surface, at least one inflection point being provided on the fifth lens element; and an aperture stop disposed between an imaged object and the third lens element. Such an arrangement of optical elements can effectively improve the image quality of the system and enable the imaging lens assembly to maintain a compact form. When the aperture stop is disposed near the object side, the telecentric feature is emphasized, resulting in a shorter total track length. When the aperture stop is disposed near the third lens element, the emphasis is on the wide field of view, and such an aperture stop placement helps to effectively reduce the sensitivity of the imaging lens assembly.

26 Claims, 18 Drawing Sheets

TABLE 1

(Embodiment 1)

f = 4.91 mm, Fno = 2.75, HFOV = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.040 | | | | |
| 2 | Lens 1 | 2.09426 (ASP) | 0.659 | Plastic | 1.544 | 55.9 | 3.43 |
| 3 | | -15.35400 (ASP) | 0.135 | | | | |
| 4 | Lens 2 | -52.20280 (ASP) | 0.732 | Plastic | 1.632 | 23.4 | -5.9 |
| 5 | | 4.03740 (ASP) | 0.955 | | | | |
| 6 | Lens 3 | -2.88804 (ASP) | 0.628 | Plastic | 1.530 | 55.8 | -97.56 |
| 7 | | -3.28930 (ASP) | 0.050 | | | | |
| 8 | Lens4 | 1.76240 (ASP) | 0.870 | Plastic | 1.530 | 55.8 | 38.31 |
| 9 | | 1.59991 (ASP) | 0.171 | | | | |
| 10 | Lens5 | 2.79994 (ASP) | 0.354 | Plastic | 1.544 | 55.9 | 98.14 |
| 11 | | 2.82322 (ASP) | 0.700 | | | | |
| 12 | IR-filter | Plano | 0.400 | Glass | 1.517 | 64.2 | |
| 13 | | Plano | 0.314 | | | | |
| 14 | Image | Plano | | | | | |

Fig.9

TABLE 2

| Aspheric Coefficients | | | | | |
|---|---|---|---|---|---|
| Surface # | 2 | 3 | 4 | 5 | 6 |
| k = | -3.21392E-01 | -9.96979E+01 | -3.00000E+02 | 1.12831E+00 | -3.12099E+01 |
| A4 = | -6.72958E-04 | -1.42720E-02 | -6.27534E-03 | 2.44295E-02 | 3.64265E-02 |
| A6 = | 2.84077E-03 | -1.92017E-02 | -2.85429E-02 | -3.39468E-02 | -4.49726E-02 |
| A8 = | -1.48080E-02 | -1.38934E-02 | 5.34835E-03 | 3.74727E-02 | 1.93911E-02 |
| A10= | 3.09168E-03 | 1.62034E-02 | 2.10873E-02 | -1.85713E-02 | -4.81560E-03 |
| A12= | | | -4.13672E-03 | 6.76116E-03 | -8.53930E-04 |
| Surface # | 7 | 8 | 9 | 10 | 11 |
| k = | 4.16773E-01 | -8.88985E+00 | -1.00183E+01 | -3.56585E+01 | -5.30164E+00 |
| A4 = | -1.31420E-02 | -7.26874E-02 | -3.79358E-02 | -9.17362E-03 | -2.21964E-02 |
| A6 = | 2.16144E-02 | 1.70634E-02 | 8.78011E-03 | 3.30039E-04 | 1.65463E-03 |
| A8 = | -4.58559E-03 | 5.09064E-05 | -1.60478E-03 | 4.51778E-05 | 4.68586E-05 |
| A10= | -6.89706E-04 | -8.38305E-04 | 1.57682E-04 | 1.06350E-05 | -8.31252E-06 |
| A12= | 6.50596E-05 | 1.09226E-04 | -6.63486E-06 | 1.00474E-06 | -5.00290E-07 |
| A14= | | -4.26029E-06 | | -3.45280E-07 | -3.86410E-09 |

Fig.10

TABLE 3

(Embodiment 2)

f = 4.19 mm, Fno = 2.85, HFOV = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.145 | | | | |
| 2 | Lens 1 | 1.53263 (ASP) | 0.614 | Plastic | 1.544 | 55.9 | 2.56 |
| 3 | | -13.02070 (ASP) | 0.050 | | | | |
| 4 | Lens 2 | 11.76660 (ASP) | 0.320 | Plastic | 1.632 | 23.4 | -4.86 |
| 5 | | 2.40970 (ASP) | 0.809 | | | | |
| 6 | Lens 3 | -0.77978 (ASP) | 0.347 | Plastic | 1.544 | 55.9 | -122.59 |
| 7 | | -0.91273 (ASP) | 0.050 | | | | |
| 8 | Lens4 | 1.92958 (ASP) | 0.601 | Plastic | 1.530 | 55.8 | 141.49 |
| 9 | | 1.76687 (ASP) | 0.218 | | | | |
| 10 | Lens5 | 10.03740 (ASP) | 0.736 | Plastic | 1.530 | 55.8 | 77.14 |
| 11 | | 12.96600 (ASP) | 0.300 | | | | |
| 12 | IR-filter | Plano | 0.400 | Glass | 1.517 | 64.2 | - |
| 13 | | Plano | 0.574 | | | | |
| 14 | Image | Plano | | | | | |

Fig.11

TABLE 4

Aspheric Coefficients

| Surface # | 2 | 3 | 4 | 5 | 6 |
|---|---|---|---|---|---|
| k = | -9.48214E-01 | -5.00000E+02 | -4.12088E+02 | -5.43177E+00 | -3.58067E+00 |
| A4 = | 7.25993E-03 | -1.27139E-01 | 2.24521E-03 | 1.21809E-01 | -3.78422E-01 |
| A6 = | -6.70871E-03 | -1.00655E-02 | -1.84495E-02 | 3.23734E-02 | 3.18255E-01 |
| A8 = | -4.01065E-02 | -7.37010E-02 | 1.12815E-02 | 6.25172E-02 | 1.96826E-02 |
| A10= | -2.23769E-01 | -4.28187E-02 | -1.12684E-01 | -1.61450E-01 | -7.62027E-02 |
| A12 = | 3.50628E-01 | 9.40052E-02 | 3.09206E-01 | 8.88630E-02 | -3.24521E-01 |
| A14 = | -5.21058E-02 | 7.32072E-02 | -5.98621E-02 | 3.44654E-01 | 7.34307E-01 |
| A16 = | -3.39505E-01 | -2.14505E-01 | -1.64353E-01 | -3.21664E-01 | -5.74015E-01 |

| Surface # | 7 | 8 | 9 | 10 | 11 |
|---|---|---|---|---|---|
| k = | -1.49431E+00 | -1.67057E+01 | -1.12919E+01 | -5.57854E+01 | -1.65257E+02 |
| A4 = | -3.56696E-02 | -7.31457E-02 | -6.62820E-02 | -3.69146E-04 | -1.04972E-03 |
| A6 = | -1.21642E-03 | 3.76009E-02 | 2.01112E-02 | -3.67731E-05 | 7.13125E-06 |
| A8 = | 8.38817E-02 | -1.06144E-02 | -5.10322E-03 | -1.26187E-06 | -1.87675E-05 |
| A10= | 5.77352E-02 | 1.22468E-03 | 6.66125E-04 | -1.19110E-06 | -3.26233E-06 |
| A12= | -4.90953E-02 | 1.19339E-04 | -4.71508E-06 | 1.57564E-07 | -1.24654E-07 |
| A14= | -4.73346E-02 | -7.10635E-05 | -1.26831E-05 | | |
| A16= | 2.68837E-02 | 7.84194E-06 | 9.34961E-07 | | |

Fig.12

TABLE 5

(Embodiment 3)

f = 4.94 mm, Fno = 2.85, HFOV = 30.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.083 | | | | |
| 2 | Lens 1 | 2.01296 (ASP) | 0.724 | Plastic | 1.544 | 55.9 | 3.10 |
| 3 | | -9.11300 (ASP) | 0.180 | | | | |
| 4 | Lens 2 | -17.91090 (ASP) | 0.633 | Plastic | 1.632 | 23.4 | -4.99 |
| 5 | | 3.88370 (ASP) | 1.053 | | | | |
| 6 | Lens 3 | -2.96983 (ASP) | 0.467 | Plastic | 1.583 | 30.2 | -31.41 |
| 7 | | -3.74960 (ASP) | 0.050 | | | | |
| 8 | Lens4 | 1.76916 (ASP) | 0.587 | Plastic | 1.544 | 55.9 | 9.09 |
| 9 | | 2.43300 (ASP) | 0.126 | | | | |
| 10 | Lens5 | 2.91446 (ASP) | 0.408 | Plastic | 1.544 | 55.9 | -9.46 |
| 11 | | 1.76931 (ASP) | 0.700 | | | | |
| 12 | IR-filter | Plano | 0.400 | Glass | 1.517 | 64.2 | - |
| 13 | | Plano | 0.321 | | | | |
| 14 | Image | Plano | | | | | |

Fig.13

TABLE 6

| | Aspheric Coefficients | | | | |
|---|---|---|---|---|---|
| Surface # | 2 | 3 | 4 | 5 | 6 |
| k = | -4.81441E-01 | -3.62073E+01 | -3.00000E+02 | 2.35961E+00 | -4.56812E+01 |
| A4 = | -3.42001E-03 | -1.82262E-02 | -2.03330E-03 | 2.83968E-02 | 2.56666E-02 |
| A6 = | -1.07418E-04 | -2.73350E-02 | -3.02281E-02 | -3.34196E-02 | -4.76277E-02 |
| A8 = | -1.86542E-02 | -1.40762E-02 | 5.44273E-03 | 3.86767E-02 | 1.84725E-02 |
| A10= | 4.00682E-04 | 1.06611E-02 | 1.94854E-02 | -1.61312E-02 | -5.22238E-03 |
| A12 = | | | -3.45232E-03 | 6.27813E-03 | -8.18477E-04 |
| Surface # | 7 | 8 | 9 | 10 | 11 |
| k = | 1.52084E+00 | -8.72637E+00 | -6.06756E+00 | -4.41665E+01 | -1.12670E+01 |
| A4 = | -1.49376E-02 | -9.97924E-02 | -5.32244E-02 | -9.21277E-03 | -2.60269E-02 |
| A6 = | 1.50885E-02 | 1.67813E-02 | 8.77520E-03 | 6.52371E-04 | 3.11946E-03 |
| A8 = | -5.75394E-03 | -1.02266E-04 | -1.89522E-03 | 8.89087E-05 | 5.88179E-05 |
| A10= | -4.01778E-04 | -9.14245E-04 | 1.01270E-04 | 7.89098E-06 | -1.50692E-05 |
| A12= | 2.77184E-04 | 9.50166E-05 | -4.48831E-06 | 3.58386E-07 | -1.03865E-06 |
| A14= | | -7.11463E-06 | | -3.16925E-07 | -2.84328E-08 |

Fig.14

TABLE 7

(Embodiment 4)

f = 4.18 mm, Fno = 2.85, HFOV = 34.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.010 | | | | |
| 2 | Lens 1 | 1.76610 (ASP) | 0.597 | Plastic | 1.544 | 55.9 | 3.16 |
| 3 | | -55.19460 (ASP) | 0.101 | | | | |
| 4 | Lens 2 | -14.40550 (ASP) | 0.346 | Plastic | 1.632 | 23.4 | -6.64 |
| 5 | | 5.97540 (ASP) | 0.947 | | | | |
| 6 | Lens 3 | -2.09782 (ASP) | 0.391 | Plastic | 1.544 | 55.9 | -83.61 |
| 7 | | -2.34367 (ASP) | 0.050 | | | | |
| 8 | Lens4 | 1.43695 (ASP) | 0.715 | Plastic | 1.530 | 55.8 | 8.36 |
| 9 | | 1.76052 (ASP) | 0.440 | | | | |
| 10 | Lens5 | -76.25000 (ASP) | 0.320 | Plastic | 1.583 | 30.2 | -6.83 |
| 11 | | 4.20870 (ASP) | 0.300 | | | | |
| 12 | IR-filter | Plano | 0.400 | Glass | 1.517 | 64.2 | - |
| 13 | | Plano | 0.364 | | | | |
| 14 | Image | Plano | | | | | |

Fig.15

TABLE 8A

Aspheric Coefficients

| Surface # | 2 | 3 | 4 | 5 | 6 |
|---|---|---|---|---|---|
| k = | -3.59207E-01 | 3.00000E+02 | 2.07595E+02 | 1.45225E+01 | -3.29835E+01 |
| A4 = | -3.29750E-03 | -5.12664E-02 | -2.07140E-02 | 4.02361E-02 | 3.68543E-02 |
| A6 = | 2.10426E-02 | -1.75879E-02 | -3.29327E-02 | -4.81475E-02 | -4.14829E-02 |
| A8 = | -1.80319E-02 | 1.15974E-02 | 2.54406E-02 | 4.51873E-02 | 2.22742E-02 |
| A10= | -3.00097E-02 | -7.39526E-03 | 5.80026E-02 | 1.66075E-03 | -4.68634E-03 |
| A12 = | | | 2.45792E-03 | 1.07698E-02 | -1.52055E-03 |

| Surface # | 7 | 9 | 10 | 11 |
|---|---|---|---|---|
| k = | -3.05117E-01 | -3.70699E+00 | 9.36728E+01 | -1.48633E+01 |
| A4 = | -1.16135E-02 | -5.72734E-02 | -7.62419E-03 | -3.80504E-02 |
| A6 = | 3.09193E-02 | 1.06776E-02 | 3.28393E-04 | 2.77243E-03 |
| A8 = | -2.47398E-03 | -1.93081E-03 | -2.58061E-04 | 6.49531E-04 |
| A10= | 3.50215E-05 | 7.93481E-05 | 7.24680E-06 | -9.14065E-05 |
| A12= | | -1.23619E-05 | | |

Fig.16A

| TABLE 8B | |
|---|---|
| Surface # | 8 |
| k = | -8.46826E+00 |
| A1 = | |
| A2 = | |
| A3 = | |
| A4 = | -1.00460E-01 |
| A5 = | |
| A6 = | 1.01730E-02 |
| A7 = | |
| A8 = | 2.07306E-03 |
| A9 = | |
| A10 = | -4.07328E-04 |
| A11 = | |
| A12= | 4.68206E-05 |

Fig.16B

Table 9

| | Embodiment 1 | Embodiment 2 | Embodiment 3 | Embodiment 4 |
|---|---|---|---|---|
| f | 4.91 | 4.19 | 4.94 | 4.18 |
| Fno | 2.75 | 2.85 | 2.85 | 2.85 |
| HFOV | 30.0 | 34.0 | 30.1 | 34.6 |
| V1-V2 | 32.5 | 32.5 | 32.5 | 32.5 |
| Vp-Vn | 0.0 | -0.1 | 25.7 | -0.1 |
| | 0.1 | -0.1 | 0.0 | 25.6 |
| f/f1 | 1.43 | 1.64 | 1.59 | 1.32 |
| f/f4 | 0.13 | 0.03 | 0.54 | 0.50 |
| |f^3/f3f4f5|^1/3 | 0.07 | 0.08 | 0.35 | 0.25 |
| R1/f | 0.43 | 0.37 | 0.41 | 0.42 |
| Ro/Ri | 0.88 | 0.85 | 0.79 | 0.90 |
| | 1.10 | 1.09 | 0.73 | 0.82 |
| | 0.99 | 0.77 | 1.65 | |
| T23/DT | 0.21 | 0.22 | 0.25 | 0.24 |
| TTL/ImgH | 2.04 | 1.71 | 1.93 | 1.69 |

Fig.17

IMAGING LENS ASSEMBLY

BACKGROUND OF THE INVENTION

1. Field of the Invention

The present invention relates to an imaging lens assembly, and more particularly, to an imaging lens assembly used in a mobile phone camera.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A conventional compact lens assembly for mobile phone cameras, such as the four lens element assembly disclosed in U.S. Pat. No. 7,365,920, generally comprises four lens elements. However, the four-element lens has become insufficient for a high-end imaging lens assembly due to the rapid increase in the resolution of mobile phone cameras, the reduction in the pixel size of sensors and the increasing demand for compact lens assemblies featuring better image quality. That is, more lens elements are necessary to achieve higher image quality, but having too many lens elements likely increases the total track length, making the lens assembly unable to maintain a compact form. Therefore, a need exists in the art for an imaging lens assembly applicable to high-resolution mobile phone cameras while maintaining a moderate total track length.

SUMMARY OF THE INVENTION

The present invention provides an imaging lens assembly including, in order from the object side to the image side: a first lens element with positive refractive power having a convex object-side surface; a second lens element with negative refractive power; a third lens element with negative refractive power; a fourth lens element with positive refractive power having a convex object-side surface; a fifth lens element having a concave image-side surface, at least one inflection point being provided on the fifth lens element; and an aperture stop disposed between an imaged object and the third lens element.

The aforementioned arrangement of optical elements can effectively correct the aberrations to improve image quality of the system and enable the total track length of the imaging lens assembly to be shortened so that the lens assembly can maintain a compact form.

In the present imaging lens assembly, the first lens element provides a positive refractive power, and the aperture stop is disposed near the object side of the imaging lens assembly, thereby the total track length of the imaging lens assembly can be reduced effectively. The aforementioned arrangement also enables the exit pupil of the imaging lens assembly to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the inflection point formed on the fifth lens element can effectively reduce the angle at which the light is projected onto the sensor from the off-axis field so that the off-axis aberrations can be further corrected. In addition, when the aperture stop is disposed near the third lens element, a wide field of view can be favorably achieved. Such an aperture stop placement facilitates the correction of the distortion and chromatic aberration of magnification, thereby the sensitivity of the imaging lens assembly can be effectively reduced. In other words, when the aperture stop is disposed near the imaged object, the telecentric feature is emphasized, and enables a shorter total track length. When the aperture stop is disposed near the third lens element, the emphasis is on the wide field of view so that the sensitivity of the imaging lens assembly can be effectively reduced.

The present invention provides another imaging lens assembly including, in order from the object side to the image side: a first lens element with positive refractive power having a convex object-side surface; a second lens element with negative refractive power; a third lens element with negative refractive power; a fourth lens element with positive refractive power having a convex object-side surface; a fifth lens element with negative refractive power having a concave image-side surface; and an aperture stop disposed between an imaged object and the second lens element.

In the aforementioned imaging lens assembly, the fifth lens element with negative refractive power and the fourth lens element with positive refractive power form a telephoto structure, thereby the back focal length of the imaging assembly can be shortened to reduce the total track length. Moreover, when the aperture stop is disposed near the object side, the telecentric feature is emphasized and results in a shorter total track length. When the aperture stop is disposed near the second lens element, the emphasis is on the wide field of view, and such an aperture stop placement can effectively reduce the sensitivity of the imaging lens assembly.

BRIEF DESCRIPTION OF THE DRAWINGS

FIG. 9 is TABLE 1 which lists the optical data of the first embodiment.

FIG. 10 is TABLE 2 which lists the aspheric surface data of the first embodiment.

FIG. 11 is TABLE 3 which lists the optical data of the second embodiment.

FIG. 12 is TABLE 4 which lists the aspheric surface data of the second embodiment.

FIG. 13 is TABLE 5 which lists the optical data of the third embodiment.

FIG. 14 is TABLE 6 which lists the aspheric surface data of the third embodiment.

FIG. 15 is TABLE 7 which lists the optical data of the fourth embodiment.

FIGS. 16A and 16B are TABLES 8A and 8B which list the aspheric surface data of the fourth embodiment.

FIG. 17 is TABLE 9 which lists the data of the respective embodiments resulting from the equations.

DETAILED DESCRIPTION OF THE PREFERRED EMBODIMENTS

Figure 1:
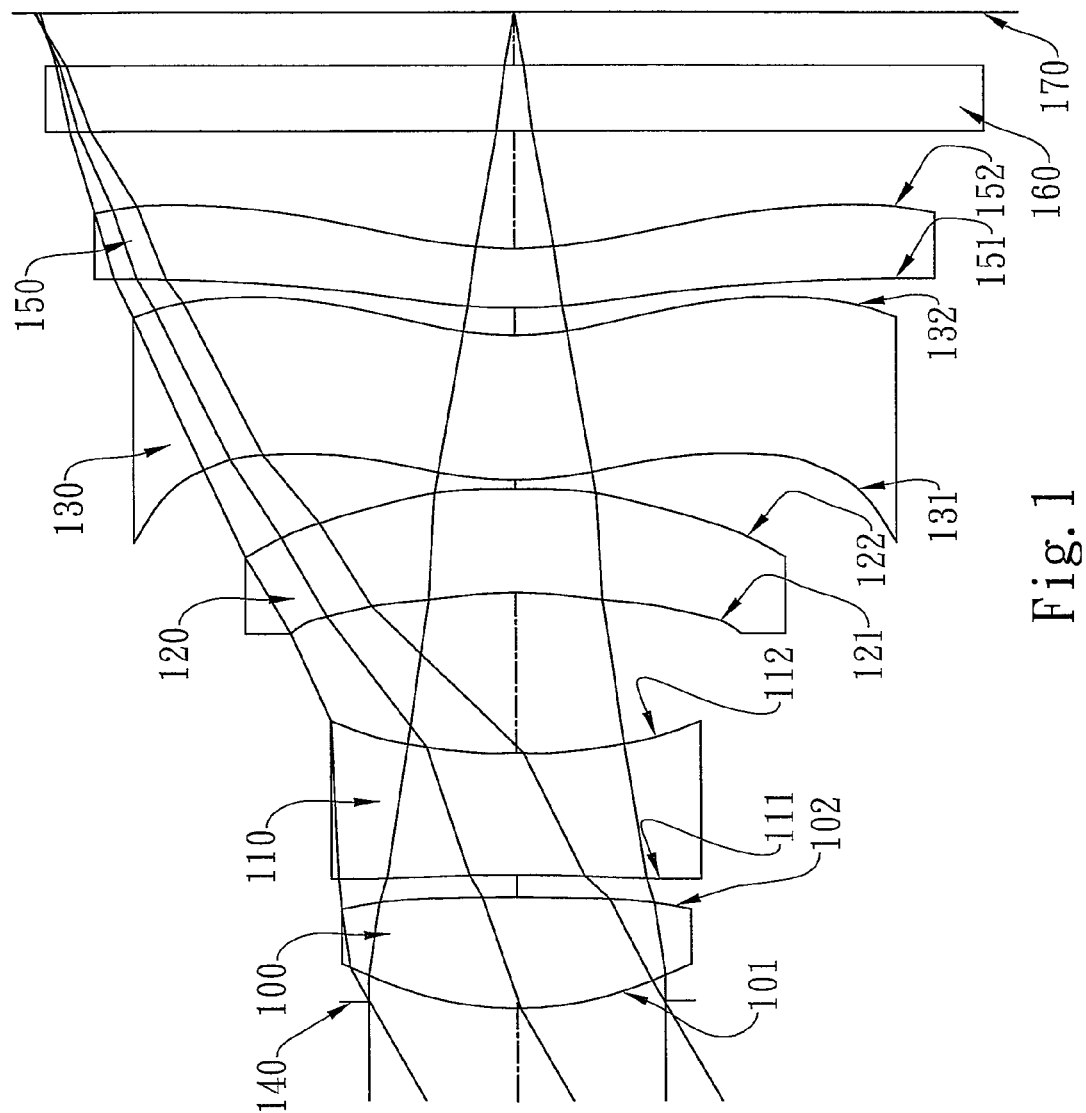
FIG. 1 shows an imaging lens assembly in accordance with a first embodiment of the present invention.

The present invention provides an imaging lens assembly including, in order from the object side to the image side: a first lens element with positive refractive power having a convex object-side surface; a second lens element with negative refractive power; a third lens element with negative refractive power; a fourth lens element with positive refractive power having a convex object-side surface; a fifth lens element having a concave image-side surface, at least one inflection point being provided on the fifth lens element; and an aperture stop disposed between an imaged object and the third lens element.

In the aforementioned imaging assembly, the first lens element has positive refractive power and a convex object-side surface so that the total track length of the imaging lens assembly can be shortened effectively; the second and third lens elements have negative refractive power so that the Petzval Sum of the imaging lens assembly can be effectively corrected, enabling the focal plane to become more flat near the periphery; the fourth lens element has positive refractive power so that the refractive power of the system can be effectively distributed between the positive first and fourth lens elements to reduce the sensitivity of the imaging lens assembly; the fifth lens element is provided with at least one inflection point so that the angle at which the light is projected onto the sensor from the off-axis field can be reduced more effectively and the off-axis aberration can be further corrected.

In the aforementioned imaging lens assembly, it is preferable that the fourth lens element has a concave image-side surface, and at least one inflection point is provided on the fourth lens element so that the astigmatism of the imaging lens assembly can be effectively corrected.

In the aforementioned imaging lens assembly, it is preferable that the second lens element has a concave image-side surface so as to effectively extend the back focal length of the imaging lens assembly, thereby providing sufficient space between the fifth lens element and the image plane to accommodate other components. Preferably, the third lens element has a concave object-side surface and a convex image-side surface. Preferably, the second lens element has a concave object-side surface. Preferably, the fifth lens element has positive refractive power so that the positive refractive power of the fourth lens element can be distributed more effectively, and the fourth and fifth lens elements with positive refractive power are disposed behind the second and third lens elements with negative refractive power so as to prevent various aberrations from becoming too large, thereby the resolution of the imaging lens assembly can be improved.

In the aforementioned imaging lens assembly, the Abbe number of the first lens element is V1, the Abbe number of the second lens element is V2, and they preferably satisfy the relation: V1−V2>20, thereby the chromatic aberration can be effectively corrected. And it will be more preferable that V1 and V2 satisfy the relation: V1−V2>30.

The aforementioned imaging lens assembly further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: TTL/ImgH<2.15. The above relation enables the imaging lens assembly to maintain a compact form.

In the aforementioned imaging lens assembly, the focal length of the imaging lens assembly is f, the focal length of the first lens element is f1, and they preferably satisfy the relation: 1.0<f/f1<2.0. When the above relation is satisfied, the refractive power of the first lens element is more balanced so that the total track length of the system can be effectively controlled to maintain the compact form of the imaging lens assembly. The above relation also prevents the high order spherical aberration from becoming too large, so that the image quality can be improved.

In the aforementioned imaging lens assembly, the focal length of the imaging lens assembly is f, the focal length of the third lens element is f3, the focal length of the fourth lens element is f4, the focal length of the fifth lens element is f5, and they preferably satisfy the relation:

$$\left| \frac{f^3}{f3 \times f4 \times f5} \right|^{\frac{1}{3}} < 0.45.$$

The above relation prevents the refractive power of the third, fourth and fifth lens elements from becoming too large, and thus the three lens elements serve as correction lenses in the imaging lens assembly to balance and correct various aberrations caused by the system, thereby the astigmatism and distortion of the imaging lens assembly can be more favorably corrected to improve the image quality. And it will be more preferable that they satisfy the relation:

$$\left| \frac{f^3}{f3 \times f4 \times f5} \right|^{\frac{1}{3}} < 0.20.$$

In the aforementioned imaging lens assembly, the radius of curvature of the object-side surface of the first lens element is R1, the focal length of the imaging lens assembly is f, and they preferably satisfy the relation: 0.30<R1/f<0.50. When the above relation is satisfied, the total track length of the imaging lens assembly can be effectively reduced. The above relation also prevents the high order aberrations from becoming too large.

In the aforementioned imaging lens assembly, it is preferable that of the third, fourth and fifth lens elements, all lens elements which are meniscus in shape satisfy the relation: $0.5 < R_o/R_i < 2.0$, wherein $R_o$ represents the radius of curvature of the object-side surface of the meniscus lens element and $R_i$ represents the radius of curvature of the image-side surface of the meniscus lens element. The above relation effectively reduces the sensitivity of the system by preventing the refractive power of the meniscus lens elements from becoming too large.

For the aforementioned imaging lens assembly, preferably there are only five lens elements with refractive power.

In the aforementioned imaging lens assembly, the on-axis spacing between the second lens element and the third lens element is T23, the on-axis spacing between the object-side surface of the first lens element and the image-side surface of the fifth lens element is DT, and they preferably satisfy the relation: 0.15<T23/DT<0.30. When the above relation is satisfied, the spacing between the second lens element and the third lens element can be controlled to prevent the total track length of the imaging lens assembly from becoming too long.

In the aforementioned imaging lens assembly, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the imaging lens assembly can be shortened effectively.

The present invention provides another imaging lens assembly including, in order from the object side to the image side: a first lens element with positive refractive power having a convex object-side surface; a second lens element with negative refractive power; a third lens element with negative refractive power; a fourth lens element with positive refractive power having a convex object-side surface; a fifth lens element with negative refractive power having a concave image-side surface; and an aperture stop disposed between an imaged object and the second lens element.

In the aforementioned imaging lens assembly, the first lens element has positive refractive power and a convex object-side surface so that the total track length of the imaging lens assembly can be shortened effectively; the second and third lens elements have negative refractive power so that the Petzval Sum of the imaging lens assembly can be effectively corrected, enabling the focal plane to become more flat near the periphery; the fourth lens element has positive refractive power so that the refractive power of the system can be effectively distributed between the positive first and fourth lens elements; the fifth lens element with negative refractive power and the fourth lens element with positive refractive power form a telephoto structure, thereby the back focal length of the imaging lens assembly can be shortened to reduce the total track length.

In the aforementioned imaging lens assembly, it is preferable that the fourth lens element has a concave image-side surface to facilitate the correction of the astigmatism of the imaging lens assembly, and the fourth and fifth lens elements are provided with inflection points so that the incidence angle at which the light is projected onto the sensor from the off-axis field can be reduced more effectively and the off-axis aberration can be further corrected.

In the aforementioned imaging lens assembly, it is preferable that the second lens element has a concave image-side surface so as to effectively lengthen the back focal length of the imaging lens assembly, thereby providing sufficient space between the fifth lens element and the image plane to accommodate other components. Preferably, the third lens element has a concave object-side surface and a convex image-side surface. Preferably, the second lens element has a concave object-side surface.

In the aforementioned imaging lens assembly, the Abbe number of the first lens element is V1, the Abbe number of the second lens element is V2, and they satisfy the relation: V1−V2>30. The above relation can effectively correct the chromatic aberration.

In the aforementioned imaging lens assembly, it is preferable that there is a lens element among the third, fourth and fifth lens elements with positive refractive power and Abbe number Vp, while there is another lens element among the three lens elements with negative refractive power and Abbe number Vn, and they satisfy the relation: Vp−Vn>20. The above relation can effectively correct the chromatic aberration.

For the aforementioned imaging lens assembly, preferably there are only five lens elements with refractive power.

The aforementioned imaging lens assembly further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: TTL/ImgH<2.05. The above relation enables the imaging lens assembly to maintain a compact form.

In the aforementioned imaging lens assembly, the focal length of the imaging lens assembly is f, the focal length of the third lens element is f3, the focal length of the fourth lens element is f4, the focal length of the fifth lens element is f5, and they preferably satisfy the relation:

$$\left| \frac{f^3}{f3 \times f4 \times f5} \right|^{\frac{1}{3}} < 0.45.$$

The above relation prevents the refractive power of the third, fourth and fifth lens elements from becoming too large, and thus the three lens elements serve as correction lenses in the imaging lens assembly to balance and correct various aberrations caused by the system, thereby the astigmatism and distortion of the imaging lens assembly can be corrected to improve the image quality. And it will be more preferable that f and f4 satisfy the relation: 0.30<f/f4<0.80. When the above relation is satisfied, the distribution of the refractive power of the fourth lens element can be controlled to facilitate the correction of the aberrations caused by the system and reduce the sensitivity of the system.

In the aforementioned imaging lens assembly, the radius of curvature of the object-side surface of the first lens element is R1, and it preferably satisfies the relation: 0.30<R1/f<0.50. When the above relation is satisfied, the total track length of the imaging lens assembly can be effectively reduced. The above relation also prevents the high order aberrations from becoming too large.

In the aforementioned imaging lens assembly, it is preferable that any of the third, fourth and fifth lens elements which is of a meniscus type satisfies the relation: $0.5<R_o/R_i<2.0$, wherein $R_o$ represents the radius of curvature of the object-side surface of the meniscus lens element and $R_i$ represents the radius of curvature of the image-side surface of the meniscus lens element. The above relation prevents the refractive power of the meniscus lens element from becoming too large, and can effectively reduce the sensitivity of the system.

In the aforementioned imaging lens assembly, the on-axis spacing between the second lens element and the third lens element is T23, the on-axis spacing between the object-side surface of the first lens element and the image-side surface of the fifth lens element is DT, and they satisfy the relation: 0.15<T23/DT<0.30. When the above relation is satisfied, the distance between the second lens element and the third lens element can be controlled to prevent the total track length of the imaging lens assembly from becoming too long.

In the aforementioned imaging lens assembly, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be formed to be aspheric and made to be non-spherical easily, allowing more design parameter freedom which can be used to reduce aberrations and the number of the lens elements, so that the total track length of the imaging lens assembly can be shortened effectively.

Preferred embodiments of the present invention will be described in the following paragraphs by referring to the accompanying drawings.

Figure 2:
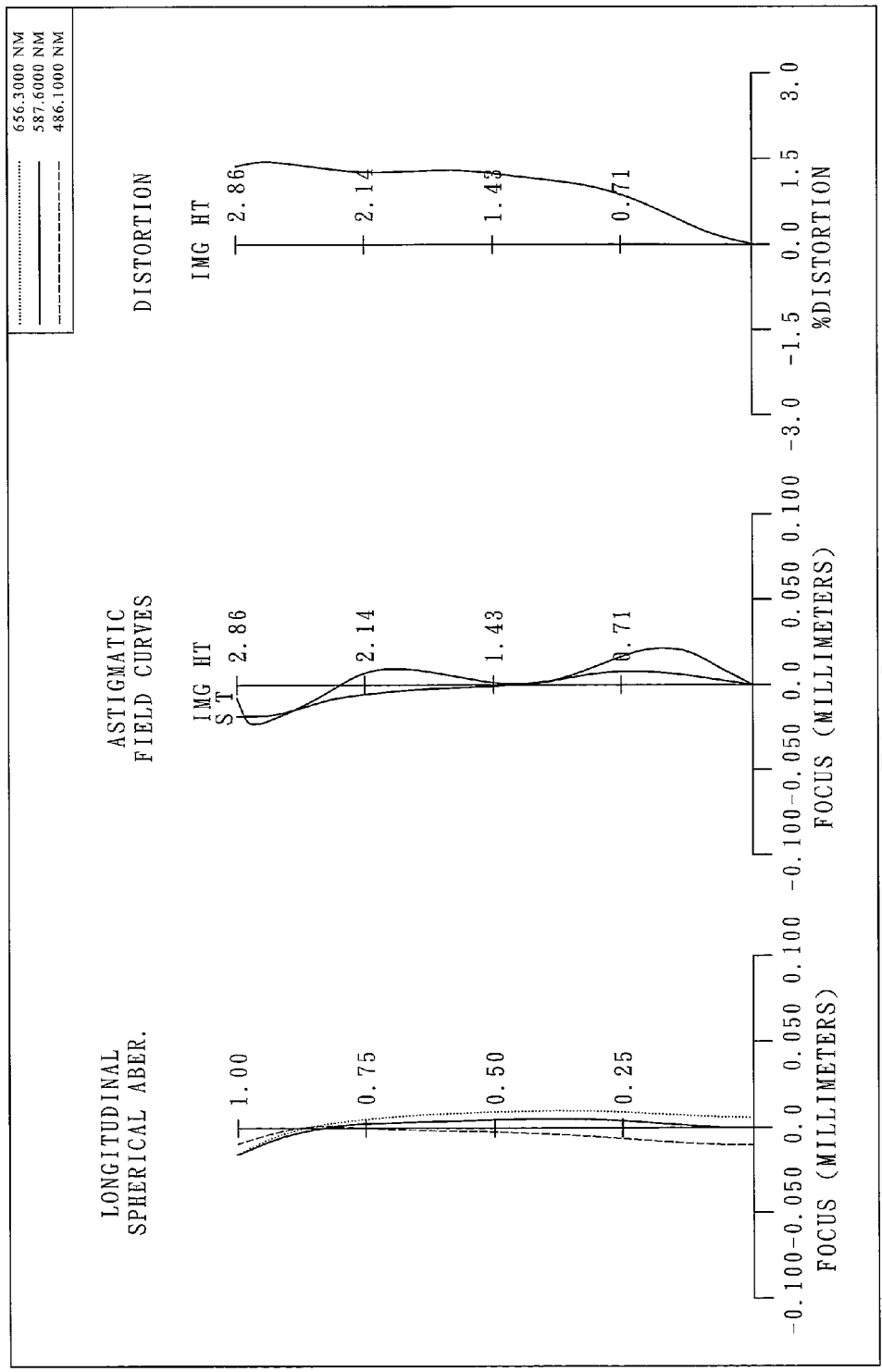
FIG. 2 shows the aberration curves of the first embodiment of the present invention.

FIG. 1 shows an imaging lens assembly in accordance with a first embodiment of the present invention, and FIG. 2 shows the aberration curves of the first embodiment of the present invention. The imaging lens assembly of the first embodiment of the present invention mainly comprises five lens elements including, in order from the object side to the image side: a plastic first lens element 100 with positive refractive power having a convex object-side surface 101 and a convex image-side surface 102, the object-side and image-side surfaces 101 and 102 thereof being aspheric; a plastic second lens element 110 with negative refractive power having a concave object-side surface 111 and a concave image-side surface 112, the object-side and image-side surfaces 111 and 112 thereof being aspheric; a plastic third lens element 120 with negative refractive power having a concave object-side surface 121 and a convex image-side surface 122, the object-side and image-side surfaces 121 and 122 thereof being aspheric; a plastic fourth lens element 130 with positive refractive power having a convex object-side surface 131 and a concave image-side surface 132, the object-side and image-side surfaces 131 and 132 thereof being aspheric, and each of which being provided with at least one inflection point; a plastic fifth lens element 150 with positive refractive power having a convex object-side surface 151 and a concave image-side surface 152, the object-side and image-side surfaces 151 and 152 thereof being aspheric, and each of which being provided with at least one inflection point; an aperture stop 140 disposed between the first lens element 100 and an imaged object; and an IR filter 160 disposed between the image-side surface 152 of the fifth lens element 150 and the image plane 170, the IR filter 160 having no influence on the focal length of the imaging lens assembly.

The equation of the aspheric surface profiles is expressed as follows:

$$X(Y) = (Y^2/R)/(l + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging lens assembly, the focal length of the imaging lens assembly is f, and it satisfies the relation: f=4.91.

In the first embodiment of the present imaging lens assembly, the f-number of the imaging lens assembly is Fno, and it satisfies the relation: Fno=2.75.

In the first embodiment of the present imaging lens assembly, half of the field of view of the imaging lens assembly is HFOV, and it satisfies the relation: HFOV=30.0 degrees.

In the first embodiment of the present imaging lens assembly, the Abbe number of the first lens element 100 is V1, the Abbe number of the second lens element 110 is V2, and they satisfy the relation: V1−V2=32.5.

In the first embodiment of the present imaging lens assembly, the fourth lens element 130 has positive refractive power and its Abbe number Vp satisfies the relation: Vp=55.8; the fifth lens element 150 has positive refractive power and its Abbe number Vp satisfies the relation: Vp=55.9; the third lens element 120 has negative refractive power and its Abbe number Vn satisfies the relation: Vn=55.8. Vp and Vn satisfy the relations:

Vp−Vn=0.0 (the fourth lens element 130 and the third lens element 120),

Vp−Vn=0.1 (the fifth lens element 150 and the third lens element 120).

In the first embodiment of the present imaging lens assembly, the focal length of the first lens element 100 is f1, the focal length of the third lens element 120 is f3, the focal length of the fourth lens element 130 is f4, the focal length of the fifth lens element 150 is f5, and they satisfy the relations:

$$f/f1=1.43,$$

$$f/f4=0.13,$$

$$\left| \frac{f^3}{f3 \times f4 \times f5} \right|^{\frac{1}{3}} = 0.07.$$

In the first embodiment of the present imaging lens assembly, the radius of curvature of the object-side surface 101 of the first lens element 100 is R1, and it satisfies the relation: R1/f=0.43.

In the first embodiment of the present imaging lens assembly, each of the third lens element 120, the fourth lens element 130 and the fifth lens element 150 is a meniscus lens element, wherein Ro represents the radius of curvature of the object-side surface of the meniscus lens element, Ri represents the radius of curvature of the image-side surface of the meniscus lens element, and they satisfy the relations:

$R_o/R_i$=0.88 (the third lens element 120), $R_o/R_i$=1.10 (the fourth lens element 130), $R_o/R_i$=0.99 (the fifth lens element 150).

In the first embodiment of the present imaging lens assembly, the on-axis spacing between the second lens element 110 and the third lens element 120 is T23, the on-axis spacing between the object-side surface 101 of the first lens element 100 and the image-side surface 152 of the fifth lens element 150 is DT, and they satisfy the relation: T23/DT=021.

In the first embodiment of the present imaging lens assembly, the imaging lens assembly is further provided with an electronic sensor at the image plane 170 on which an object is imaged. The on-axis spacing between the object-side surface 101 of the first lens element 100 and the electronic sensor is TTL, half of the diagonal length of the effective pixel area of the electronic sensor is ImgH, and they satisfy the relation: TTL/ImgH=2.04.

The detailed optical data of the first embodiment is shown in FIG. 9 (TABLE 1), and the aspheric surface data is shown in FIG. 10 (TABLE 2), wherein the units of the radius of curvature, the thickness and the focal length are expressed in mm, and HFOV is half of the maximal field of view.

Figure 3:
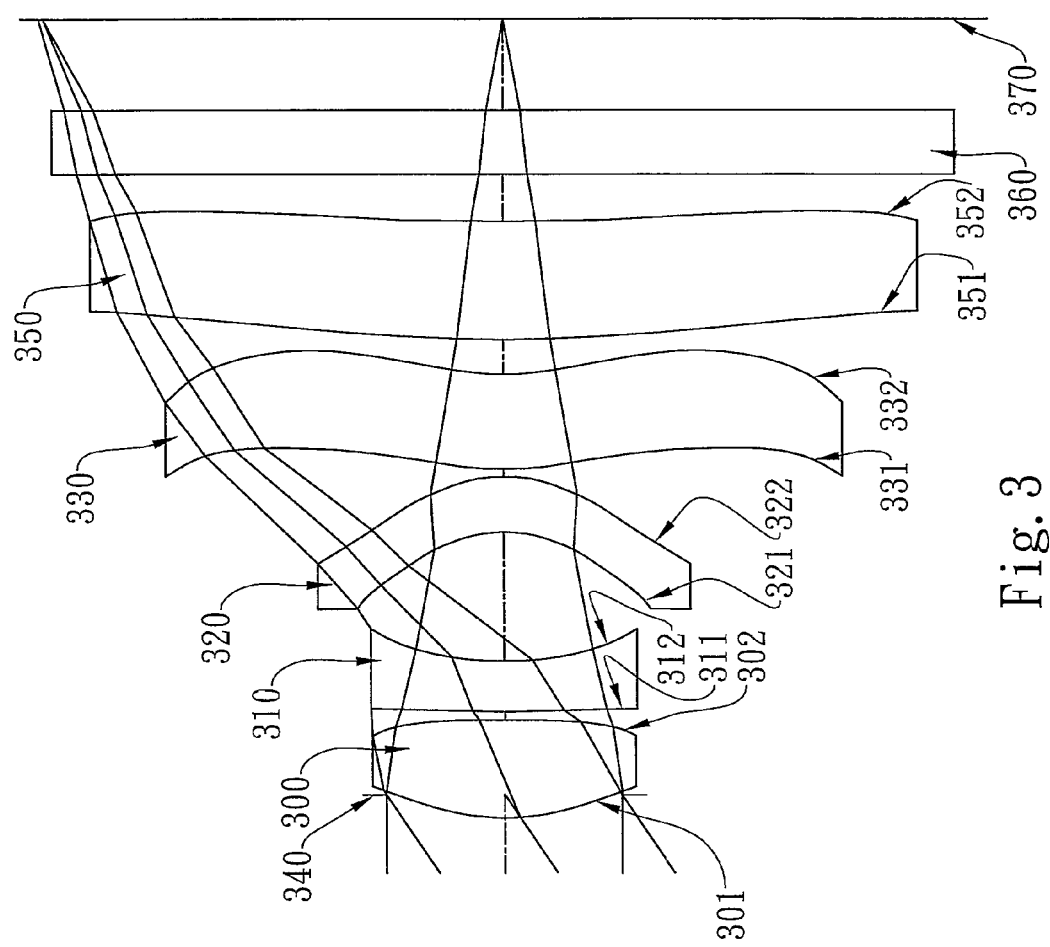
FIG. 3 shows an imaging lens assembly in accordance with a second embodiment of the present invention.
Figure 4:
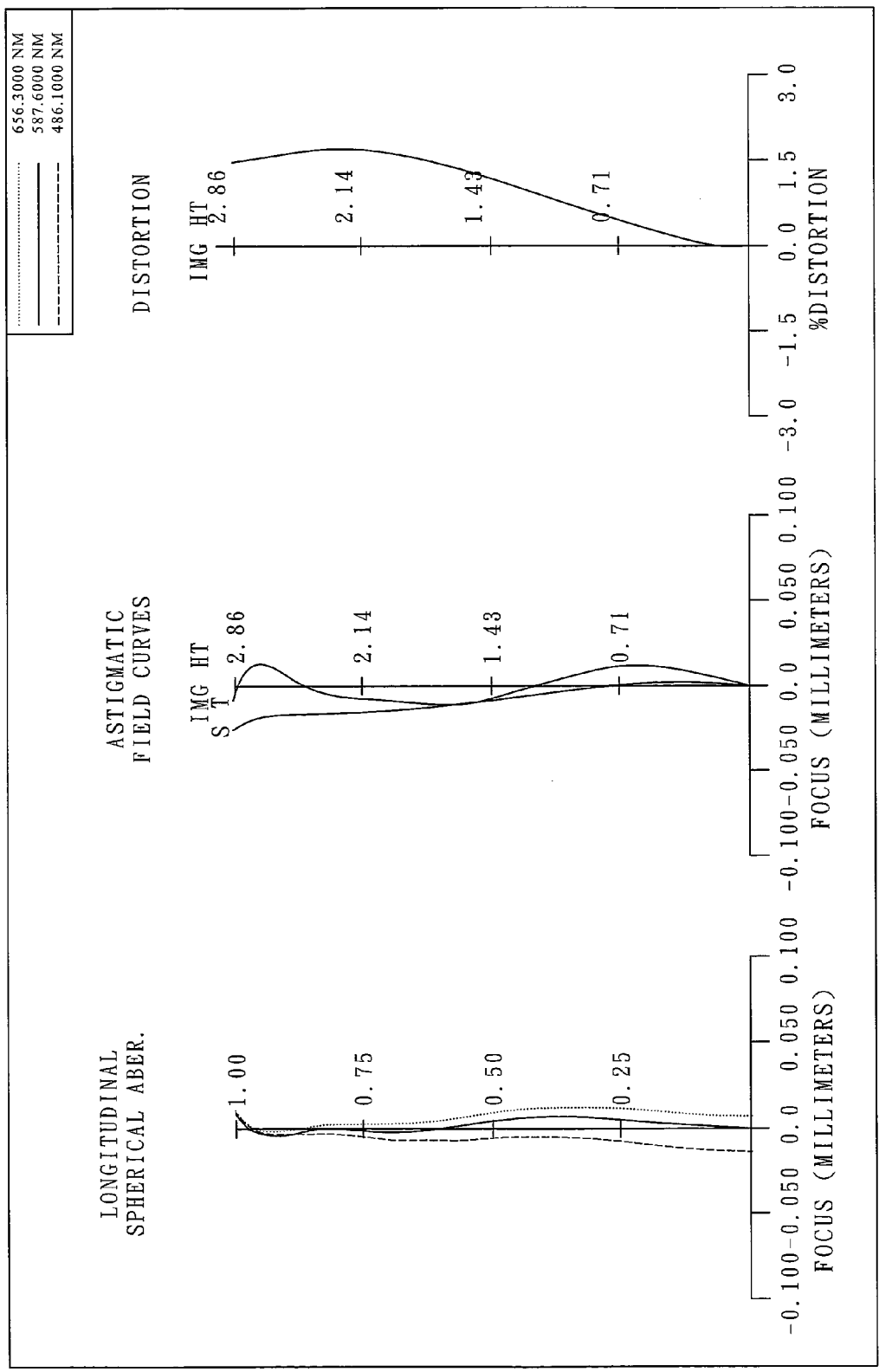
FIG. 4 shows the aberration curves of the second embodiment of the present invention.

FIG. 3 shows an imaging lens assembly in accordance with a second embodiment of the present invention, and FIG. 4 shows the aberration curves of the second embodiment of the present invention. The imaging lens assembly of the second embodiment of the present invention mainly comprises five lens elements including, in order from the object side to the image side: a plastic first lens element 300 with positive refractive power having a convex object-side surface 301 and a convex image-side surface 302, the object-side and image-side surfaces 301 and 302 thereof being aspheric; a plastic second lens element 310 with negative refractive power having a convex object-side surface 311 and a concave image-side surface 312, the object-side and image-side surfaces 311 and 312 thereof being aspheric; a plastic third lens element 320 with negative refractive power having a concave object-side surface 321 and a convex image-side surface 322, the object-side and image-side surfaces 321 and 322 thereof being aspheric; a plastic fourth lens element 330 with positive refractive power having a convex object-side surface 331 and a concave image-side surface 332, the object-side and image-side surfaces 331 and 332 thereof being aspheric, and each of which being provided with at least one inflection point; a plastic fifth lens element 350 with positive refractive power having a convex object-side surface 351 and a concave image-side surface 352, the object-side and image-side surfaces 351 and 352 thereof being aspheric, and each of which being provided with at least one inflection point; an aperture stop 340 disposed between the first lens element 300 and an imaged object; and an IR filter 360 disposed between the image-side surface 352 of the fifth lens element 350 and the image plane 370, the IR filter 360 having no influence on the focal length of the imaging lens assembly.

The equation of the aspheric surface profiles of the second embodiment has the same form as that of the first embodiment.

In the second embodiment of the present imaging lens assembly, the focal length of the imaging lens assembly is f, and it satisfies the relation: f=4.19.

In the second embodiment of the present imaging lens assembly, the f-number of the imaging lens assembly is Fno, and it satisfies the relation: Fno=2.85.

In the second embodiment of the present imaging lens assembly, half of the field of view of the imaging lens assembly is HFOV, and it satisfies the relation: HFOV=34.0 degrees.

In the second embodiment of the present imaging lens assembly, the Abbe number of the first lens element 300 is V1, the Abbe number of the second lens element 310 is V2, and they satisfy the relation: V1−V2=32.5.

In the second embodiment of the present imaging lens assembly, the fourth lens element 330 has positive refractive power and its Abbe number Vp satisfies the relation: Vp=55.8; the fifth lens element 350 has positive refractive power and its Abbe number Vp satisfies the relation: Vp=55.8; the third lens element 320 has negative refractive power and its Abbe number Vn satisfies the relation: Vn=55.9. Vp and Vn satisfy the relations:

Vp−Vn=−0.1 (the fourth lens element 330 and the third lens element 320)

Vp−Vn=−0.1 (the fifth lens element 350 and the third lens element 320)

In the second embodiment of the present imaging lens assembly, the focal length of the first lens element 300 is f1, the focal length of the third lens element 320 is f3, the focal length of the fourth lens element 330 is f4, the focal length of the fifth lens element 350 is f5, and they satisfy the relations:

$$f/f1=1.64,$$

$$f/f4=0.03,$$

$$\left|\frac{f^3}{f3 \times f4 \times f5}\right|^{\frac{1}{3}} = 0.08.$$

In the second embodiment of the present Imaging lens assembly, the radius of curvature of the object-side surface 301 of the first lens element 300 is R1, and it satisfies the relation: R1/f=0.37.

In the second embodiment of the present imaging lens assembly, each of the third lens element 320, the fourth lens element 330 and the fifth lens element 350 is a meniscus lens element, wherein Ro represents the radius of curvature of the object-side surface of the meniscus lens element, Ri represents the radius of curvature of the image-side surface of the meniscus lens element, and they satisfy the relations:

$R_o/R_i$=0.85 (the third lens element 320),
$R_o/R_i$=1.09 (the fourth lens element 330),
$R_o/R_i$=0.77 (the fifth lens element 350).

In the second embodiment of the present imaging lens assembly, the on-axis spacing between the second lens element 310 and the third lens element 320 is T23, the on-axis spacing between the object-side surface 301 of the first lens element 300 and the image-side surface 352 of the fifth lens element 350 is DT, and they satisfy the relation: T23/DT=0.22.

In the second embodiment of the present imaging lens assembly, the imaging lens assembly is further provided with an electronic sensor at the image plane 370 on which an object is imaged. The on-axis spacing between the object-side surface 301 of the first lens element 300 and the electronic sensor is TTL, half of the diagonal length of the effective pixel area of the electronic sensor is ImgH, and they satisfy the relation: TTL/ImgH=1.71.

The detailed optical data of the second embodiment is shown in FIG. 11 (TABLE 3), and the aspheric surface data is shown in FIG. 12 (TABLE 4), wherein the units of the radius of curvature, the thickness and the focal length are expressed in mm, and HFOV is half of the maximal field of view.

Figure 5:
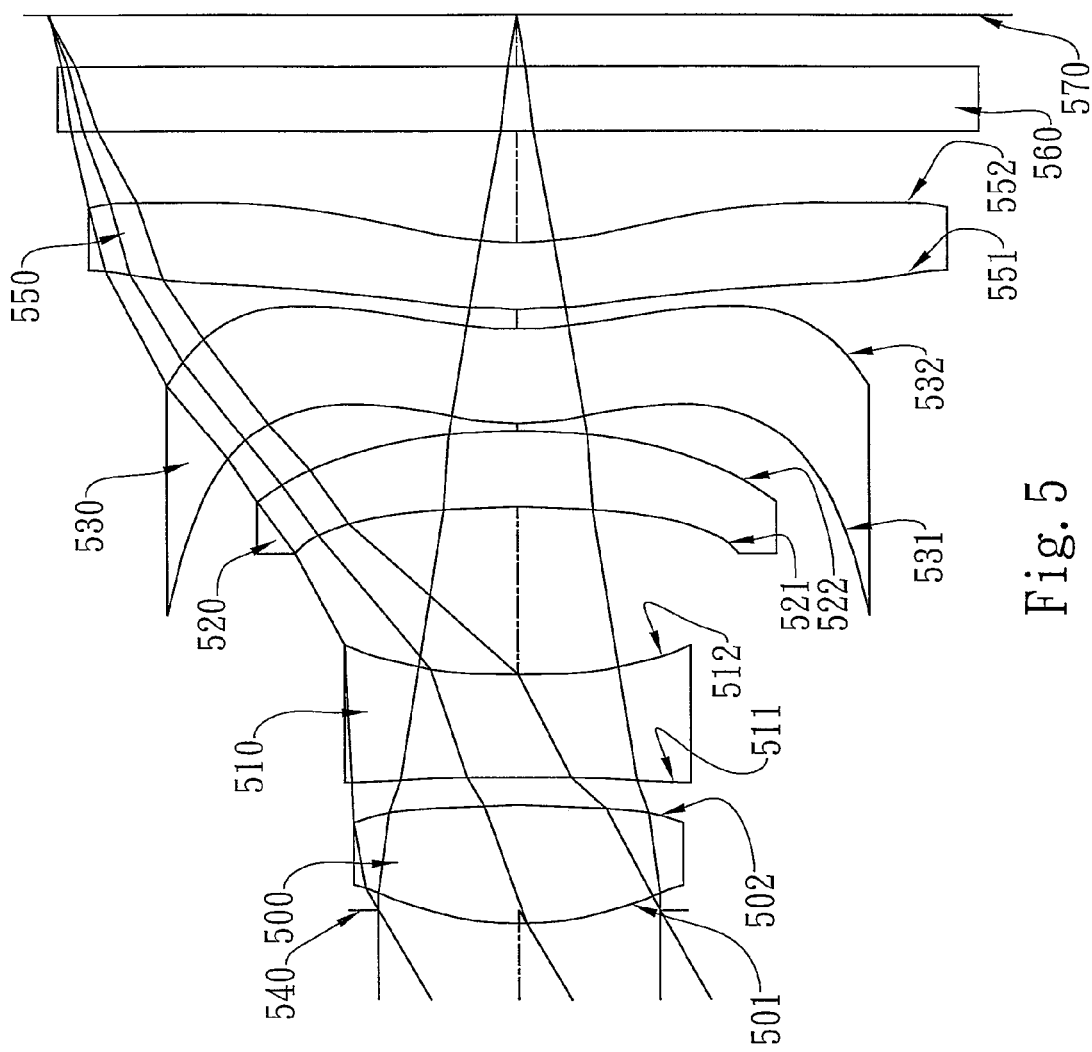
FIG. 5 shows an imaging lens assembly in accordance with a third embodiment of the present invention.
Figure 6:
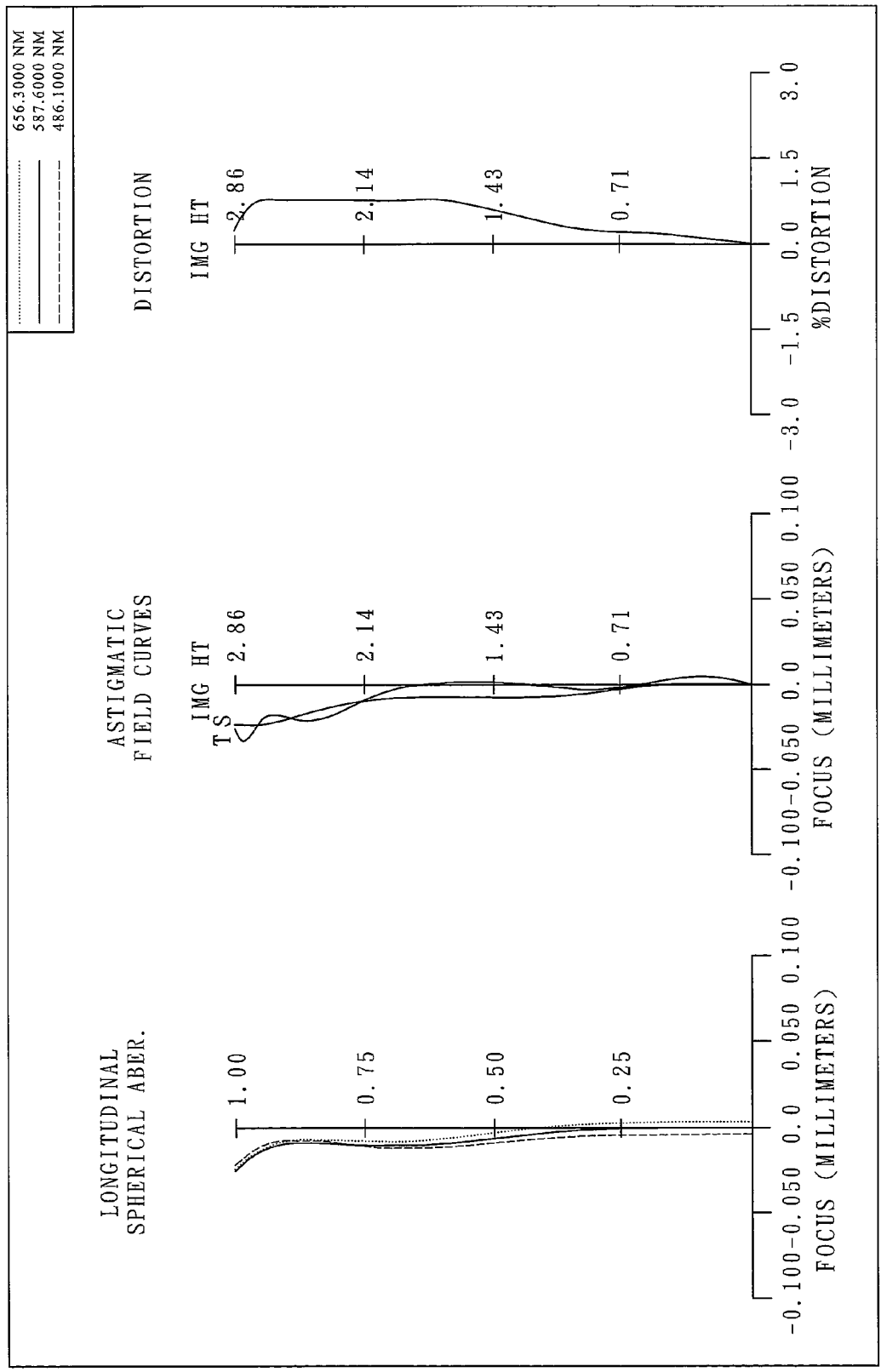
FIG. 6 shows the aberration curves of the third embodiment of the present invention.

FIG. 5 shows an imaging lens assembly in accordance with a third embodiment of the present invention, and FIG. 6 shows the aberration curves of the third embodiment of the present invention. The imaging lens assembly of the third embodiment of the present invention mainly comprises five lens elements including, in order from the object side to the image side: a plastic first lens element 500 with positive refractive power having a convex object-side surface 501 and a convex image-side surface 502, the object-side and image-side surfaces 501 and 502 thereof being aspheric; a plastic second lens element 510 with negative refractive power having a concave object-side surface 511 and a concave image-side surface 512, the object-side and image-side surfaces 511 and 512 thereof being aspheric; a plastic third lens element 520 with negative refractive power having a concave object-side surface 521 and a convex image-side surface 522, the object-side and image-side surfaces 521 and 522 thereof being aspheric; a plastic fourth lens element 530 with positive refractive power having a convex object-side surface 531 and a concave image-side surface 532, the object-side and image-side surfaces 531 and 532 thereof being aspheric, and each of which being provided with at least one inflection point; a plastic fifth lens element 550 with negative refractive power having a convex object-side surface 551 and a concave image-side surface 552, the object-side and image-side surfaces 551 and 552 thereof being aspheric, and each of which being provided with at least one inflection point; an aperture stop 540 disposed between the first lens element 500 and an imaged object; and an IR filter 560 disposed between the image-side surface 552 of the fifth lens element 550 and the image plane 570, the IR filter 560 having no influence on the focal length of the imaging lens assembly.

The equation of the aspheric surface profiles of the third embodiment has the same form as that of the first embodiment.

In the third embodiment of the present imaging lens assembly, the focal length of the imaging lens assembly is f, and it satisfies the relation: f=4.94.

In the third embodiment of the present imaging lens assembly, the f-number of the imaging lens assembly is Fno, and it satisfies the relation: Fno=2.85.

In the third embodiment of the present imaging lens assembly, half of the field of view of the imaging lens assembly is HFOV, and it satisfies the relation: HFOV=30.1 degrees.

In the third embodiment of the present imaging lens assembly, the Abbe number of the first lens element 500 is V1, the Abbe number of the second lens element 510 is V2, and they satisfy the relation: V1−V2=32.5.

In the third embodiment of the present imaging lens assembly, the fourth lens element 530 has positive refractive power and its Abbe number Vp satisfies the relation: Vp=55.9; the third lens element 520 has negative refractive power and its Abbe number Vn satisfies the relation: Vn=30.2; the fifth lens element 550 has negative refractive power and its Abbe number Vn satisfies the relation: Vn=55.9. Vp and Vn satisfy the relations:

Vp−Vn=25.7 (the fourth lens element 530 and the third lens element 520),

Vp−Vn=0.0 (the fourth lens element 530 and the fifth lens element 550).

In the third embodiment of the present imaging lens assembly, the focal length of the first lens element 500 is f1, the focal length of the third lens element 520 is f3, the focal length of the fourth lens element 530 is f4, the focal length of the fifth lens element 550 is f5, and they satisfy the relations:

$$f/f1=1.59,$$

$$f/f4=0.54,$$

$$\left| \frac{f^3}{f3 \times f4 \times f5} \right|^{\frac{1}{3}} = 0.35.$$

In the third embodiment of the present imaging lens assembly, the radius of curvature of the object-side surface 501 of the first lens element 500 is R1, and it satisfies the relation: R1/f=0.41.

In the third embodiment of the present imaging lens assembly, each of the third lens element 520, the fourth lens element 530 and the fifth lens element 550 is a meniscus lens element, wherein Ro represents the radius of curvature of the object-side surface of the meniscus lens element, Ri represents the radius of curvature of the image-side surface of the meniscus lens element, and they satisfy the relations:

$R_o/R_i$=0.79 (the third lens element 520),
$R_o/R_i$=0.73 (the fourth lens element 530),
$R_o/R_i$=1.65 (the fifth lens element 550).

In the third embodiment of the present imaging lens assembly, the on-axis spacing between the second lens element 510 and the third lens element 520 is T23, the on-axis spacing between the object-side surface 501 of the first lens element 500 and the image-side surface 552 of the fifth lens element 550 is DT, and they satisfy the relation: T23/DT=0.25.

In the third embodiment of the present imaging lens assembly, the imaging lens assembly is further provided with an electronic sensor at the image plane 570 on which an object is imaged. The on-axis spacing between the object-side surface 501 of the first lens element 500 and the electronic sensor is TTL, half of the diagonal length of the effective pixel area of the electronic sensor is ImgH, and they satisfy the relation: TTL/ImgH=1.93.

The detailed optical data of the third embodiment is shown in FIG. 13 (TABLE 5), and the aspheric surface data is shown in FIG. 14 (TABLE 6), wherein the units of the radius of curvature, the thickness and the focal length are expressed in mm, and HFOV is half of the maximal field of view.

Figure 7:
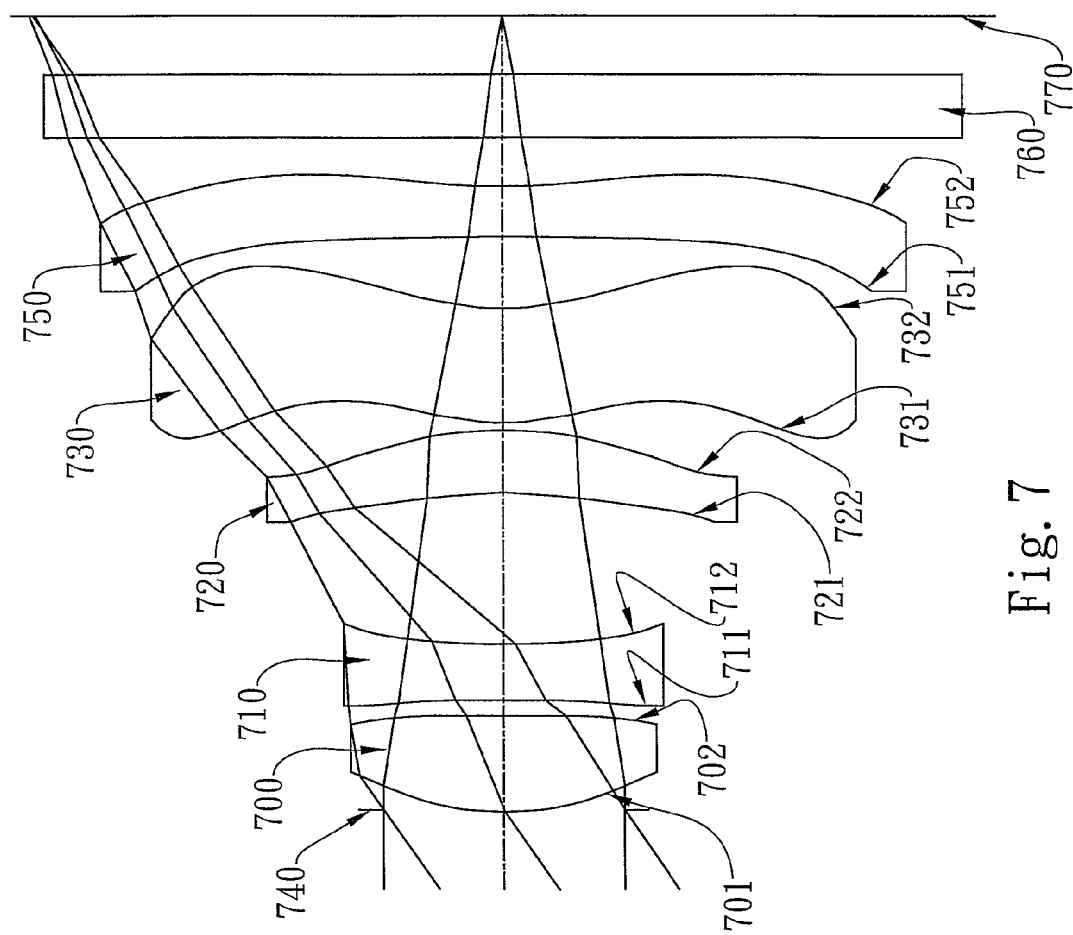
FIG. 7 shows an imaging lens assembly in accordance with a fourth embodiment of the present invention.
Figure 8:
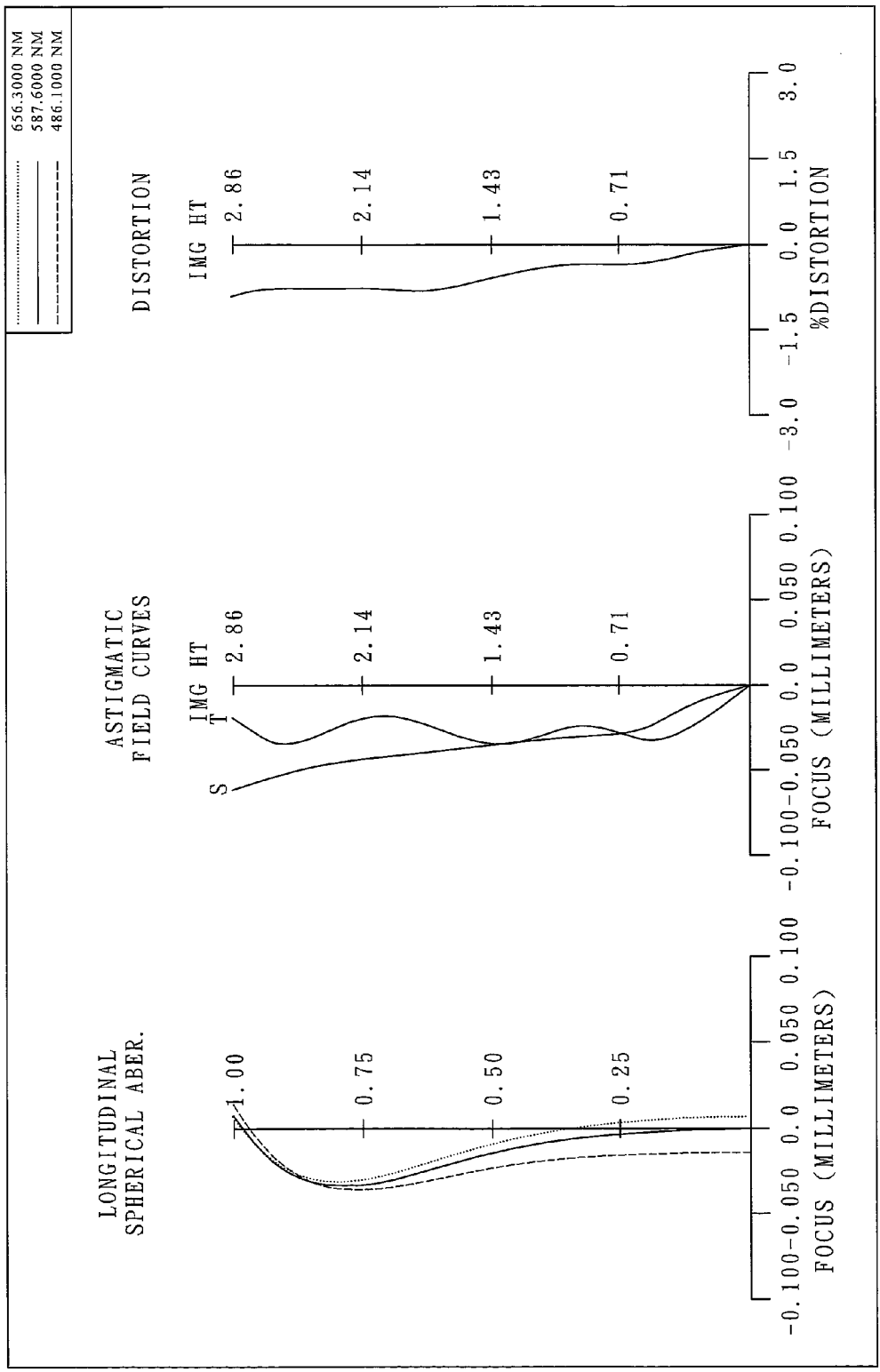
FIG. 8 shows the aberration curves of the fourth embodiment of the present invention.

FIG. 7 shows an imaging lens assembly in accordance with a fourth embodiment of the present invention, and FIG. 8 shows the aberration curves of the fourth embodiment of the present invention. The imaging lens assembly of the fourth embodiment of the present invention mainly comprises five lens elements including, in order from the object side to the image side: a plastic first lens element 700 with positive refractive power having a convex object-side surface 701 and a convex image-side surface 702, the object-side and image-side surfaces 701 and 702 thereof being aspheric; a plastic second lens element 710 with negative refractive power having a concave object-side surface 711 and a concave image-side surface 712, the object-side and image-side surfaces 711 and 712 thereof being aspheric; a plastic third lens element 720 with negative refractive power having a concave object-side surface 721 and a convex image-side surface 722, the object-side and image-side surfaces 721 and 722 thereof being aspheric; a plastic fourth lens element 730 with positive refractive power having a convex object-side surface 731 and a concave image-side surface 732, the object-side and image-side surfaces 731 and 732 thereof being aspheric, and each of which being provided with at least one inflection point; a plastic fifth lens element 750 with negative refractive power having a concave object-side surface 751, a concave image-side surface 752 and at least one inflection point formed on the image-side surface 752, the object-side and image-side surfaces 751 and 752 thereof being aspheric; an aperture stop 740 disposed between the first lens element 700 and an imaged object; and an IR filter 760 disposed between the image-side surface 752 of the fifth lens element 750 and the image plane 770, the IR filter 760 having no influence on the focal length of the imaging lens assembly.

The equation of the aspheric surface profiles of the fourth embodiment has the same form as that of the first embodiment.

In the fourth embodiment of the present imaging lens assembly, the focal length of the imaging lens assembly is f, and it satisfies the relation: f=4.18.

In the fourth embodiment of the present imaging lens assembly, the f-number of the imaging lens assembly is Fno, and it satisfies the relation: Fno=2.85.

In the fourth embodiment of the present imaging lens assembly, half of the field of view of the imaging lens assembly is HFOV, and it satisfies the relation: HFOV=34.6 degrees.

In the fourth embodiment of the present imaging lens assembly, the Abbe number of the first lens element 700 is V1, the Abbe number of the second lens element 710 is V2, and they satisfy the relation: V1−V2=32.5.

In the fourth embodiment of the present imaging lens assembly, the fourth lens element 730 has positive refractive power and its Abbe number Vp satisfies the relation: Vp=55.8; the third lens element 720 has negative refractive power and its Abbe number Vn satisfies the relation: Vn=55.9; the fifth lens element 750 has negative refractive power and its Abbe number Vn satisfies the relation: Vn=30.2. Vp and Vn satisfy the relations:

Vp−Vn=−0.1 (the fourth lens element 730 and the third lens element 720)

Vp−Vn=25.6 (the fourth lens element 730 and the fifth lens element 750)

In the fourth embodiment of the present imaging lens assembly, the focal length of the first lens element 700 is f1, the focal length of the third lens element 720 is f3, the focal length of the fourth lens element 730 is f4, the focal length of the fifth lens element 750 is f5, and they satisfy the relations:

$$f/f1=1.32,$$

$$f/f4=0.50,$$

$$\left|\frac{f^3}{f3\times f4\times f5}\right|^{\frac{1}{3}}=0.25.$$

In the fourth embodiment of the present imaging lens assembly, the radius of curvature of the object-side surface 701 of the first lens element 700 is R1, and it satisfies the relation: R1/f=0.42.

In the fourth embodiment of the present imaging lens assembly, each of the third lens element 720 and the fourth lens element 730 is a meniscus lens element, wherein Ro represents the radius of curvature of the object-side surface of the meniscus lens element, Ri represents the radius of curvature of the image-side surface of the meniscus lens element, and they satisfy the relations:

$R_o/R_i$=0.90 (the third lens element 720), $R_o/R_i$=0.82 (the fourth lens element 730).

In the fourth embodiment of the present imaging lens assembly, the on-axis spacing between the second lens element 710 and the third lens element 720 is T23, the on-axis spacing between the object-side surface 701 of the first lens element 700 and the image-side surface 752 of the fifth lens element 750 is DT, and they satisfy the relation: T23/DT=0.24.

In the fourth embodiment of the present imaging lens assembly, the imaging lens assembly is further provided with an electronic sensor at the image plane 770 on which an object is imaged. The on-axis spacing between the object-side surface 701 of the first lens element 700 and the electronic sensor is TTL, half of the diagonal length of the effective pixel area of the electronic sensor is ImgH, and they satisfy the relation: TTL/ImgH=1.69.

The detailed optical data of the fourth embodiment is shown in FIG. 15 (TABLE 7), and the aspheric surface data is shown in FIGS. 16A and 16B (TABLES 8A and 8B), wherein the units of the radius of curvature, the thickness and the focal length are expressed in mm, and HFOV is half of the maximal field of view.

It is to be noted that TABLES 1-8 (illustrated in FIGS. 9-16 respectively) show different data of the different embodiments, however, the data of the different embodiments are obtained from experiments. Therefore, any imaging lens assembly of the same structure is considered to be within the scope of the present invention even if it uses different data. TABLE 9 (illustrated in FIG. 17) shows the data of the respective embodiments resulted from the equations.

What is claimed is:

1. An imaging lens assembly comprising, in order from an object side to an image side:
    a first lens element with positive refractive power having a convex object-side surface;
    a second lens element with negative refractive power;
    a third lens element with negative refractive power;
    a fourth lens element with positive refractive power having a convex object-side surface;
    a fifth lens element having a concave image-side surface, at least one inflection point being provided on the fifth lens element; and
    an aperture stop disposed between an imaged object and the third lens element,
    wherein the fourth lens element has a concave image-side surface, at least one inflection point being provided on the fourth lens element.

2. The imaging lens assembly according to claim 1, wherein the second lens element has a concave image-side surface; the third lens element has a concave object-side surface and a convex image-side surface; the fifth lens element has positive refractive power.

3. The imaging lens assembly according to claim 2, wherein the second lens element has a concave object-side surface.

4. The imaging lens assembly according to claim 1, wherein an Abbe number of the first lens element is V1, an Abbe number of the second lens element is V2, and they satisfy the relation: V1−V2>20.

5. The imaging lens assembly according to claim 4, wherein the Abbe number of the first lens element is V1, the Abbe number of the second lens element is V2, and they satisfy the relation: V1−V2>30.

6. The imaging lens assembly according to claim 1, wherein there are only five lens elements with refractive power.

7. The imaging lens assembly according to claim 6 further comprising an electronic sensor on which an object is imaged, wherein an on-axis spacing between the object-side surface of the first lens element and the electronic sensor is TTL, half of the diagonal length of the effective pixel area of the electronic sensor is ImgH, and they satisfy the relation: TTL/ImgH<2.15.

8. The imaging lens assembly according to claim 6, wherein an on-axis spacing between the second lens element and the third lens element is T23, an on-axis spacing between the object-side surface of the first lens element and the image-side surface of the fifth lens element is DT, and they satisfy the relation: 0.15<T23/DT<0.30.

9. The imaging lens assembly according to claim 1, wherein a focal length of the imaging lens assembly is f, a focal length of the first lens element is f1, and they satisfy the relation: 1.0<f/f1<2.0.

10. The imaging lens assembly according to claim 9, wherein the focal length of the imaging lens assembly is f, a focal length of the third lens element is f3, a focal length of the fourth lens element is f4, a focal length of the fifth lens element is f5, and they satisfy the relation:

$$\left|\frac{f^3}{f3\times f4\times f5}\right|^{\frac{1}{3}}<0.45.$$

11. The imaging lens assembly according to claim 10, wherein f, f3, f4 and f5 further satisfy the relation:

$$\left|\frac{f^3}{f3\times f4\times f5}\right|^{\frac{1}{3}}<0.20.$$

12. The imaging lens assembly according to claim 1, wherein a radius of curvature of the object-side surface of the first lens element is R1, the focal length of the imaging lens assembly is f, and they satisfy the relation: 0.30<R1/f<0.50.

13. The imaging lens assembly according to claim 12, wherein any of the third, fourth and fifth lens elements which is of a meniscus type satisfies the relation: $0.5 < R_o/R_i < 2.0$, wherein $R_o$ represents a radius of curvature of an object-side surface of the meniscus lens element and $R_i$ represents a radius of curvature of an image-side surface of the meniscus lens element.

14. The imaging lens assembly according to claim 1, wherein the aperture stop is disposed between the imaged object and the first lens element.

15. An imaging lens assembly comprising, in order from an object side to an image side:
   a first lens element with positive refractive power having a convex object-side surface;
   a second lens element with negative refractive power;
   a third lens element with negative refractive power;
   a fourth lens element with positive refractive power having a convex object-side surface and a concave image-side surface;
   a fifth lens element with negative refractive power having a concave image-side surface;
   an aperture stop disposed between an imaged object and the second lens element; and
   wherein both the fourth lens element and the fifth lens element have at least one inflection point.

16. The imaging lens assembly according to claim 15, wherein the second lens element has a concave image-side surface and the third lens element has a concave object-side surface and a convex image-side surface.

17. The imaging lens assembly according to claim 16, wherein the second lens element has a concave object-side surface.

18. The imaging lens assembly according to claim 15, wherein an Abbe number of the first lens element is V1, an Abbe number of the second lens element is V2, and they satisfy the relation: V1−V2>30.

19. The imaging lens assembly according to claim 18, wherein there is a lens element among the third, fourth and fifth lens elements with positive refractive power and Abbe number Vp, and another lens element among the three lens elements with negative refractive power and Abbe number Vn, and they satisfy the relation: Vp−Vn>20.

20. The imaging lens assembly according to claim 15, wherein there are only five lens elements with refractive power.

21. The imaging lens assembly according to claim 20 further comprising an electronic sensor on which an object is imaged, wherein an on-axis spacing between the object-side surface of the first lens element and the electronic sensor is TTL, half of the diagonal length of the effective pixel area of the electronic sensor is ImgH, and they satisfy the relation: TTL/ImgH<2.05.

22. The imaging lens assembly according to claim 20, wherein an on-axis spacing between the second lens element and the third lens element is T23, an on-axis spacing between the object-side surface of the first lens element and the image-side surface of the fifth lens element is DT, and they satisfy the relation: 0.15<T23/DT<0.30.

23. The imaging lens assembly according to claim 15, wherein a focal length of the imaging lens assembly is f, a focal length of the third lens element is f3, a focal length of the fourth lens element is f4, a focal length of the fifth lens element is f5, and they satisfy the relation:

$$\left| \frac{f^3}{f3 \times f4 \times f5} \right|^{\frac{1}{3}} < 0.45.$$

24. The imaging lens assembly according to claim 23, wherein the focal length of the imaging lens assembly is f, the focal length of the fourth lens element is f4, and they satisfy the relation: 0.30<f/f4<0.80.

25. The imaging lens assembly according to claim 15, wherein the aperture stop is disposed between the imaged object and the first lens element.

26. An imaging lens assembly comprising, in order from an object side to an image side:
   a first lens element with positive refractive power having a convex object-side surface;
   a second lens element with negative refractive power;
   a third lens element with negative refractive power;
   a fourth lens element with positive refractive power having a convex object-side surface;
   a fifth lens element with negative refractive power having a concave image-side surface;
   an aperture stop disposed between an imaged object and the second lens element; and
   wherein a radius of curvature of the object-side surface of the first lens element is R1, the focal length of the imaging lens assembly is f, and they satisfy the relation: 0.30<R1/f<0.50,
   wherein any of the third, fourth and fifth lens elements which is of a meniscus type satisfies the relation: $0.5 < R_o/R_i < 2.0$, wherein $R_o$ represents a radius of curvature of an object-side surface of the meniscus lens element and $R_i$ represents a radius of curvature of an image-side surface of the meniscus lens element.

\* \* \* \* \*